INVENTOR.
ROBERT A. LEIGHTNER
BY Bernard N. Wiener
ATTORNEY 3,148,359

SHIFT REGISTER

Robert A. Leightner, Tioga Center, N.Y., assignor to International Business Machines Corporation, New York, N.Y., a corporation of New York Filed Nov. 2, 1961, Ser. No. 149,671
7 Claims. (Cl. 340—174)

This invention relates generally to devices for temporary storage of digital information and relates particularly to a one magnetic core per binary information bit electromagnetic shift register.

A shift register accepts a binary information bit applied thereto in the form of an electrical pulse and stores it temporarily in a binary information bit storage means therein. Concomitant with each subsequent binary information bit applied to the shift register, the immediately precedent stored binary information bit is shifted or transferred to another binary information storage means associated with the shift register by pulse transfer circuitry. The pulse transfer circuitry causes each storage means to reset to a common initial condition, i.e., indicative of either a binary information bit "0" or a binary information bit "1."

A one magnetic core per binary information bit electromagnetic shift register utilizes a magnetic core having a substantially rectangular hysteresis loop characteristic in each binary information storage means thereof. The magnetic core in a precedent storage means is termed the "transferor" core and the magnetic core in a subsequent storage means is termed the "transferee" core. The prior art provides two types of the one magnetic core per binary information bit electromagnetic shift register. One type incorporates a regenerative circuit in each storage means whereby output energy from the magnetic core therein is conveyed in positive feedback to the reset driver winding thereon to accelerate resetting of the core. The other type electromagnetic shift register incorporates an amplifier circuit in each energy storage means thereof whereby the output set pulse from the transferor core is amplified to assure the setting of the transferee core.

A prior art shift register of each type also incorporates delay circuitry to delay the set pulse from the transferor magnetic core so that the setting of the transferee magnetic core is not interfered with by the resetting thereof. Both reset and set pulses must be carefully timed for the delay circuitry to perform properly.

The set pulse has to be applied to the transferee core after the termination of the resetting thereof by the reset pulse. As pulse height and wave shape degradation occur in the delay circuitry, the set pulse must be amplified for the setting of the transferee core. Timing problems are complicated by the large number of component parameters affecting the set pulse delay.

Objects of this invention include the provision of:

First, a device for temporary storage of digital information wherein it is immaterial in each binary information storage means thereof if the set pulse therefor occurs concomitantly with the reset pulse.

Second, a one magnetic core per binary information bit electromagnetic shift register wherein it is immaterial for each magnetic core thereof if the set pulse occurs concomitantly with the reset pulse.

Third, a one magnetic core per binary information bit electromagnetic shift register wherein a gated variable-length-pulse generating means is utilized in the set pulse transfer circuit between the transferor core of a precedent binary information bit storage means and the transferee magnetic core of a subsequent binary information bit storage means to assure that the reset pulse does not impair the action of the set pulse in the transferee core.

Fourth, a one magnetic core per binary information bit electromagnetic shift register wherein a four layer transistor circuit is utilized in the set pulse transfer circuit between the transferor core of a precedent binary information bit storage means and the transferee magnetic core of a subsequent binary information bit storage means to assure that the reset pulse does not impair the action of the set pulse in the transferee core.

Fifth, a one magnetic core per binary information bit electromagnetic shift register having small component count timing circuitry with wide component parameter tolerances.

The foregoing and other objects, features and advantages of the invention will be apparent from the following more particular description of a preferred embodiment of the invention as illustrated in the accompanying drawings.

In the drawings:

FIGURE 1 is a schematic diagram of an embodiment of a one magnetic core per binary information bit electromagnetic shift register in accordance with this invention illustrating the use of a four layer transistor as a gated variable-length-pulse generating means in the set pulse transfer circuit between the transferor core and the transferee core to assure that the reset pulse does not impair the action of the set pulse;

Figure 7:
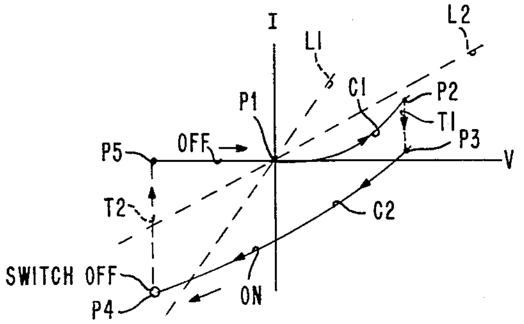
Figure 8:
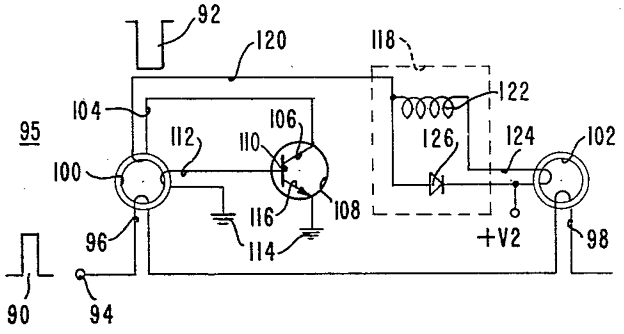
Figure 9:
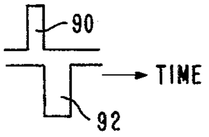

FIGURE 7 presents the volt-ampere characteristic of the base to emitter junction of a typical four layer transistor; and FIGURES 8 and 9 illustrate a typical prior art shift register and the nature of and the timing relationship between the set pulse and the reset pulse thereof, respectively.

This invention provides a device for temporary storage of digital information. An aspect thereof is an electromagnetic shift register with a temporary energy storage means for each binary information bit applied thereto. Each precedent energy storage means has a transferor magnetic core therein and each subsequent energy storage means has a transferee magnetic core therein. The cores have substantially rectangular hysteresis loops. Reset pulse means resets each core when an input binary information bit is applied to the shift register. A set pulse energy transfer means is connected between the transferor core and the transferee core. The transfer means includes a gated variable-length-pulse generating means. The transfer means provides a set pulse to the transferee core at a lesser power than the reset pulse applied thereto. The amplitude of the set pulse is less and its time extension is greater than the amplitude and time extension of the reset pulse. The integrated energy content of the set pulse is equal to or greater than the integrated energy content of the reset pulse.

A particular embodiment of a shift register in accordance with this invention incorporates a three-terminal four layer transistor in each set pulse transfer means as the gated variable-length-pulse generating means therein.

Each binary information bit applied to the shift register is stored in one of the two remanent conditions of a magnetic core, e.g., a "1" in the "up" condition and a "0" in the "down" condition. The reset pulse resets all the magnetic cores of the shift register. Each core which is in a set condition at reset time generates a positive voltage pulse at the base of the immediately subsequent four layer transistor, thereby turning it on. The four layer transistor output pulse sets the immediately subsequent core after the reset pulse therefor subsides. The large collector current gain and the predictable minority carrier storage time of the four layer transistor assure proper shift register operation. The predictable minority carrier storage time is utilized to prevent the reset pulse from impairing the operation of the set pulse. The large collector current gain is utilized to amplify the output pulse from the transferor core.

A preferred embodiment 10 of the electromagnetic shift register in accordance with this invention will be described with reference to FIG. 1. Each binary information bit is applied to input terminals 12 and 14 in the form of a positive current pulse 16 for a binary "1" and a zero pulse for a binary "0." The dot convention utilized in FIG. 1 places a dot on the end of a winding on a core which becomes positive relative to the other end when the core is being set. Current out of the dot end of a winding drives the flux in the core toward the reset condititon.

Input terminals 12 and 14 are connected to input winding 18 on magnetic core 20. Output winding 22 on core 20 is connected to four layer transistor 24. Terminal 26 of output winding 22 is connected to the base 27 of four layer transistor 24 and terminal 28 thereof is connected to ground 29. Collector 30 of four layer transistor 24 is connected via resistor 32 to input winding 34 of core 36. Emitter 33 of four layer transistor 24 is connected to ground 29. The other end 35 of input winding 34 is connected to positive source of voltage +V1. Output winding 38 of magnetic core 36 is connected at one end to base 39 of four layer transistor 40. It is connected at its other end to ground 29. Collector 41 of four layer transistor 40 is connected via resistor 43 to input winding 45 of magnetic core 46. Emitter 47 of four layer transistor 40 is connected to ground 29.

Reset conductor 52 links cores 20, 36 and 46 and has applied to it reset pulse 54 on terminal 56. Reset pulse 54 is sufficient to cause reset of each of these magnetic cores. Output winding 59 on core 46 provides output pulse 60.

Shift register 10 has two information units 48 and 50. Information unit 48 includes precedent core 20, four layer transistor 24 and subsequent core 36. Information unit 50 includes precedent core 36, four layer transistor 40 and subsequent core 46.

Figure 1:
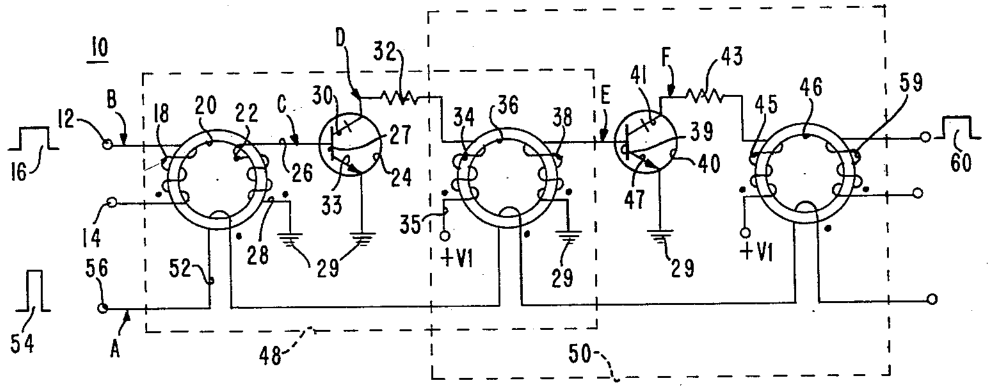
Figure 2:
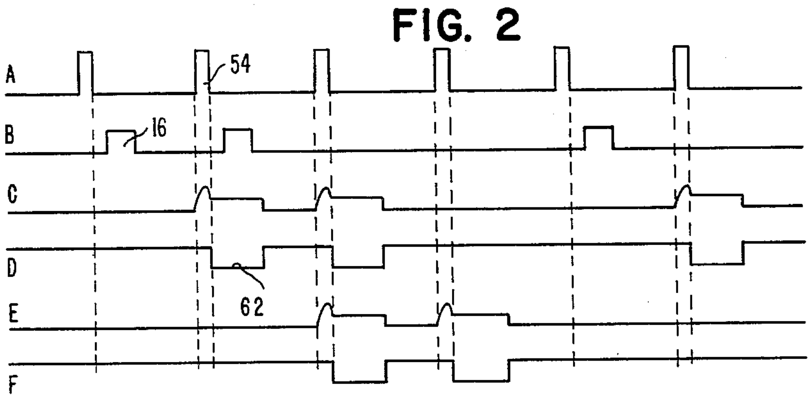
FIGURE 2 is a timing diagram for the shift register of FIGURE 1 showing the relationships among waveforms at various locations therein.

FIG. 2 is a waveform timing diagram for the shift register 10 of FIG. 1. The reset pulse current waveform is shown as curve A. A typical binary information bit current input waveform is shown as curve B. Curve C is the voltage waveform on the base electrode 27 of four layer transistor 24. It is the sum of the voltage induced in winding 22 and the current-resistance drop therein when the four layer transistor 24 supplies base current. Curve D is the collector 30 output voltage of four layer transistor 24. The illustrative set pulse 62 width of the collector 30 current is greater than the width of the reset pulse 54. Illustratively, the reset pulse 54 and set pulse 62 do not coexist. Circuit parameters determine the extent of their coexistence. Curves E and F are the input base 39 voltage and the collector 41 output voltage of the four layer transistor 40, respectively.

Figure 3:
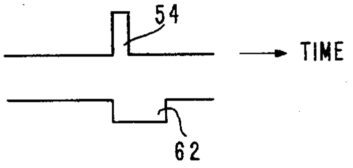
FIGURE 3 illustrates the nature of and the timing relationship between the set pulse and reset pulse applied to a transferee magnetic core of a shift register in accordance with this invention.

FIG. 3 illustrates the timing relationship between a set pulse 62 and a reset pulse 54 when circuit parameters are such that they coexist. Set pulse 62 has an integrated energy content equal to or greater than that of reset pulse 54.

Figure 4:
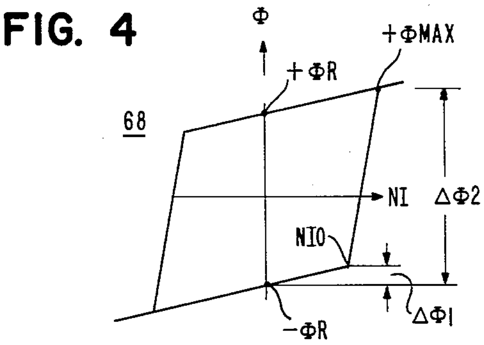
FIGURE 4 is an idealized hysteresis loop useful for explaining the nature of remanent magnetic flux conditions of a magnetic core suitable for the practice of this invention.

An idealized substantially rectangular hysteresis loop 68 for a magnetic flux condition of an illustrative magnetic core, e.g., core 20, is shown in FIG. 4. The total flux in the core is the ordinate $\phi$. The driving ampere-turns of a winding, e.g., winding 18 on the core 20 is the abscissa NI. The two remanent flux conditions are $+\phi R$ and $-\phi R$. The reset condition of core 20 is at point $-\phi R$. The set condition thereof is at point $+\phi R$. If the flux condition of core 20 is at point $-\phi R$ and a small positive driving ampere-turns NI0 is applied to winding 18 thereon, a small flux change $\Delta\phi 1$ occurs. When the driving ampere-turns sufficiently exceeds NI0, the flux condition of core 20 is switched to point $+\phi$ Max. with a consequent large flux change $\Delta\phi 2$. The voltage induced in another winding on core 20, e.g., winding 22, is proportional to the rate of flux change therein. Therefore, the output voltage from a change of the flux condition depends upon the magnitude and direction of the applied driving ampere-turns and whether the flux condition is $+\phi R$ or $-\phi R$.

Figure 5:
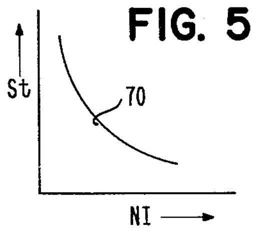
FIGURE 5 is an illustrative curve showing the inverse relationship between the switching-time of a remanent magnetic flux condition of a magnetic core and the driving ampere-turns.

Curve 70 of FIG. 5 illustrates the inverse relationship between the switching-time $St$ of a magnetic flux condition of a magnetic core and the magnitude of the driving ampere-turns NI. Curve 70 demonstrates that a magnetic core can be switched between two remanent conditions by a large amplitude and short time interval pulse or by a small amplitude and long time interval pulse.

The four layer transistor is a PNPN bistable switching device. It can be switched off through a current pulse applied to the base thereof. An illustrative description of a four layer transistor is presented at pp. 71–73 of the text "Transistor Physics and Circuits" by R. L. Riddle and M. P. Ristenbatt, Prentice Hall, Inc., 1958.

Figure 6:
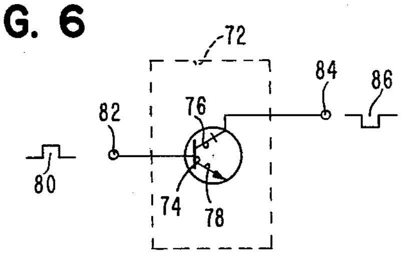
FIGURE 6 illustrates schematically a four layer transistor for the practice of this invention.

FIGURE 6 presents a schematic of a four layer transistor 72. The four layer transistor 72 has base 74, collector 76 and emitter 78. An input pulse 80 applied to base 74 on input terminal 82 appears at the collector 76 output terminal 84 as waveform 86. The amplitude and duration of the output pulse 86 relative to the input pulse 80 is controllable by choice of the particular four layer transistor and associated circuit parameters.

FIG. 7 shows the current I versus voltage V characteristic of the base 74 to emitter 78 junction when the four layer transistor 72 is switched on and off by input pulse 80. Assuming that four layer transistor 72 is initially in its "OFF" state at curve point P1, the base current is zero. As the base voltage is increased, the base current follows curve C1 until curve point P2 is reached. The input current is sufficient at curve point P2 to turn the four layer transistor 72 to its "ON" state, and the base 74 current passes on transition curve T1 to curve point P3. Transition curve T1 results from the four layer transistor 72 supplying part of its own input current through redistribution of its internal minority carriers. As the base 74 voltage is reduced, the base current follows curve C2 until curve point P4 is reached. At curve point P4 the input current has changed direction and is large enough to overcome the input current supplied by four layer transistor 72. Since the base to emitter junction is back-biased, no base current flows and the base arrives at curve point P5 via transition curve T2. If the base voltage is now increased, the base 74 follows curve C1 to curve point P1. If the base impedance is chosen to give a load line L1, the four layer transistor 72 has two stable states. If the base impedance is lowered to provide a load line L2, as in the practice of this invention, the four layer transistor has "OFF" as the only stable state. The specific slope of a four layer transistor load line is determined by the particular four layer transistor and its associated circuit parameters.

The distinction of the operation of a magnetic shift register in accordance with this invention from the operation of the prior art magnetic shift register will be understood through reference to FIGS. 8 and 9. The prior art pulses shown in FIG. 9 are the reset pulse 90 and the set pulse 92. They do not coexist. Reset pulse 90 is applied to conductor 94 of prior art shift register 95 which is connected to reset windings 96 and 98 on magnetic cores 100 and 102, respectively. Regenerative winding 104 on magnetic core 100 is connected to collector 106 of amplifier transistor 108. Base 110 of transistor 108 is connected via output winding 112 on magnetic core 100 to ground 114. Emitter 116 of transistor 108 is connected to ground 114. The other end of regenerative winding 104 is connected to delay circuit 118 via conductor 120. Delay circuit 118 includes the series path of inductor 122, one end of set winding 124 on magnetic core 102 and diode 126. The other end of set winding 124 is connected to positive voltage supply +V2. In order that the magnetic core 102 is set rather than reset, the set pulse 92 from transistor 108 must occur subsequent to the termination of the reset pulse 90 and be of a greater magnitude to account for the loss in the delay circuit 118.

The set pulse 62 (FIG. 3) for the practice of this invention can terminate any time subsequent to the initiation of reset pulse 54. Four layer transistor 24 output pulse 62 has a smaller pulse height and a greater time duration than the reset pulse 54. The result is that the subsequent core 36 is set during a longer period than that during which it is reset. Since the final state of a magnetic core is the same for a given integral of transferred energy, the isolation of the transferor core from the transferee core is accomplished by causing the energy transfer to occur over a longer time interval.

The operation of the shift register in accordance with this invention will be understood through reference to FIGS. 1 to 4. For an initial condition, it will be assumed that magnetic cores 20 and 46 are in the binary "1" condition and the magnetic core 36 is in the binary "0" condition. After a binary "1" input pulse 16 has been applied to input terminal 12, the reset current pulse 54 causes magnetic cores 20 and 46 to reset to the "0" condition and leaves magnetic core 36 in its original reset condition. The reset flux change of core 20 results in a transfer of energy through the transfer circuit including four layer transistor 24. Magnetic core 36 is thereby established in the "1" condition and the magnetic core 46 is established in the "0" condition. It is apparent that input pulse 16 may be the output from a precedent storage means, not shown. It is also apparent that the output of magnetic core 46 may be applied to a subsequent storage means, not shown. Further, the output winding 59 of shift register 10 may be connected to its input winding 18 and thereby provide a clock register.

This invention has utility for several aspects of a device for digital computation, e.g., shift registers and clock registers.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A one core per bit electromagnetic shift register having a transferor magnetic core to provide a set pulse, a transferee magnetic core to receive said set pulse and reset pulse generating means to provide a common reset pulse for said cores, characterized by a transfer circuit means coupled between said cores to cause said transferred set pulse to have a smaller magnitude and greater time duration than said reset pulse.

2. An electromagnetic shift register including: a transferor magnetic core and a transferee magnetic core; means for applying sequential binary information bits to said transferor core; means for resetting each said transferee core in concert to a common binary information bit remanent condition; and, means responsive to said resetting for transferring each said applied binary information bit from said transferor core to said transferee core, said latter means including a gated variable-length-pulse generating means for providing a set pulse having a smaller magnitude and greater time duration than said reset pulse.

3. Device for temporary storage of binary information comprising, in combination, an energy transferor means, an energy transferee means and an energy transfer means, said transferor means accepting binary information and storing it temporarily and thereafter transferring said stored energy via said energy transfer means to said transferee means, reset means coupled to said transferor means and said transferee means for resetting them to a common initial binary condition, said energy transfer means being characterized by the quality of transferring said stored energy at a lesser power than the energy of resetting by said reset means and over a greater time interval whereby the action of said reset energy does not impair the action of said set energy.

4. An electromagnetic shift register for temporary storage of binary information, including: a binary information transferor magnetic core, said core having a substantially rectangular hysteresis loop, a first input winding on said transferor core, means adapted to apply a sequence of binary information bits to said first input winding, a first output winding on said transferor core, a gated variable-length-pulse generating semiconductor device coupled to said first output winding and adapted to receive set pulse energy from said transferor core, a transferee magnetic core, said transferee magnetic core having a substantially rectangular hysteresis loop, a second input winding on said transferee core coupled to said semiconductor device and adapted to receive a set pulse therefrom, a first reset winding on said transferor core and a second reset winding on said transferee core, said reset windings being adapted to cause resetting of said magnetic cores when a binary information bit is applied to said first input winding, said set pulse from said semiconductor device having a smaller amplitude and greater time duration than said reset pulse, and a second output winding on said transferee core, said output winding being adapted to receive stored binary information bit energy from said transferee core, whereby the immediately preceding binary information bit stored in said transferor core is transferred to said transferee core and said applied binary information bit is stored in said transferor core.

5. The shift register of claim 4 in which said gated variable-length-pulse generating semiconductor device includes a four layer transistor.

6. The shift register of claim 4 in which said gated variable-length-pulse generating semiconductor device includes a four layer transistor having its base connected to said first output winding, its collector connected to said input winding and its emitter connected to ground.

7. An electromagnetic shift register for temporary storage of binary information, including: a plurality of sequential binary information units, each said unit having a binary information transferor magnetic core, and a binary information transferee core, the transferee core of a precedent unit being the transferor core of a subsequent unit, each of said cores having a substantially rectangular hysteresis loop, a first input winding on said transferor core, means adapted to apply a sequence of binary information bits to said first input winding, a first reset winding on said transferor core and a second reset winding on said transferee core, said reset windings being adapted to cause resetting of said magnetic cores when a binary information bit is applied to said first input winding, an output winding on said transferor core, a gated variable-length-pulse generating semiconductor device coupled to said first output winding and adapted to receive output information from said transferor core, said semiconductor device having a four layer transistor, a second input winding on said transferee core coupled to said semiconductor device and adapted to receive set pulse energy therefrom, and a second output winding on said transferee core, said output winding being adapted to receive stored binary information bit energy from said transferee core, whereby the immediately succeeding binary information bit stored in said transferor core is transferred to said transferee core and said applied binary information bit is stored in said transferor core.

References Cited in the file of this patent

UNITED STATES PATENTS 2,991,374 De Miranda et al. -------- July 4, 1961

UNITED STATES PATENT OFFICE

CERTIFICATE OF CORRECTION

Patent No. 3,148,359 September 8, 1964

Robert A. Leightner

It is hereby certified that error appears in the above numbered patent requiring correction and that the said Letters Patent should read as corrected below.

Column 6, line 1, after "said", second occurrence, insert -- transferor and --; column 6, line 58, after "said" insert -- second --.

Signed and sealed this 19th day of January 1965.

(SEAL)
Attest:

ERNEST W. SWIDER
Attesting Officer

EDWARD J. BRENNER
Commissioner of Patents